Oct. 16, 1962  A. A. MILLER  3,058,374
FLUID PRESSURE CONTROL OR SERVO SYSTEMS
Filed May 19, 1958  5 Sheets-Sheet 4

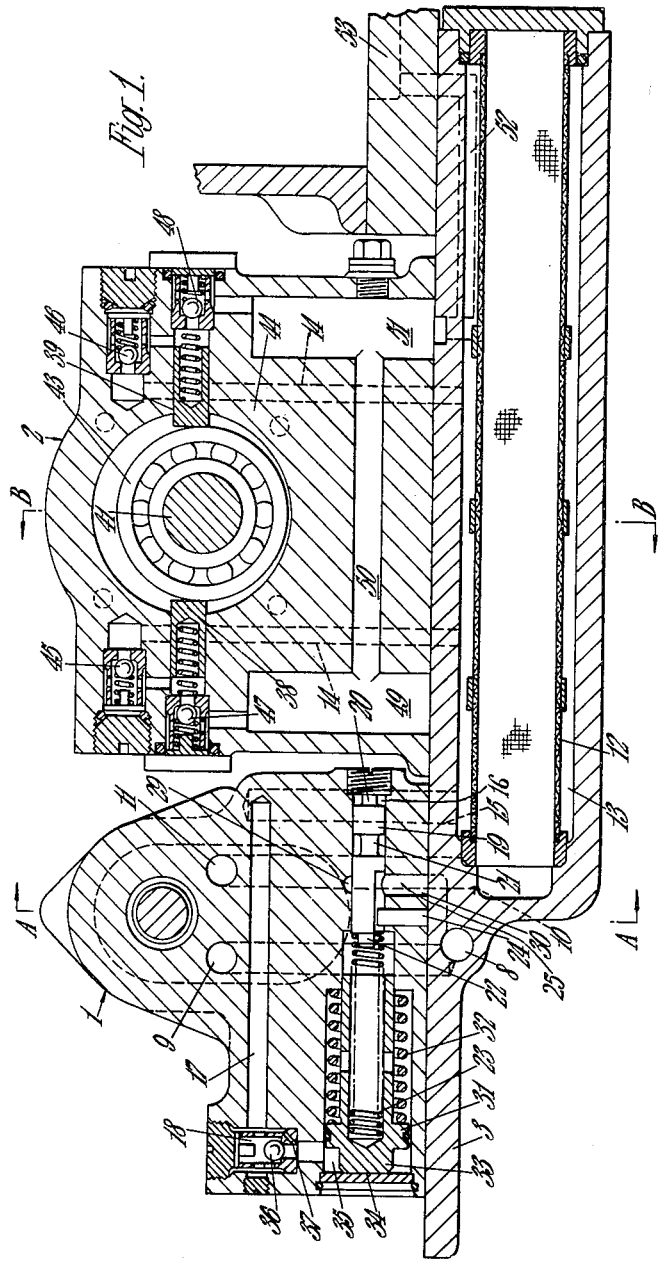

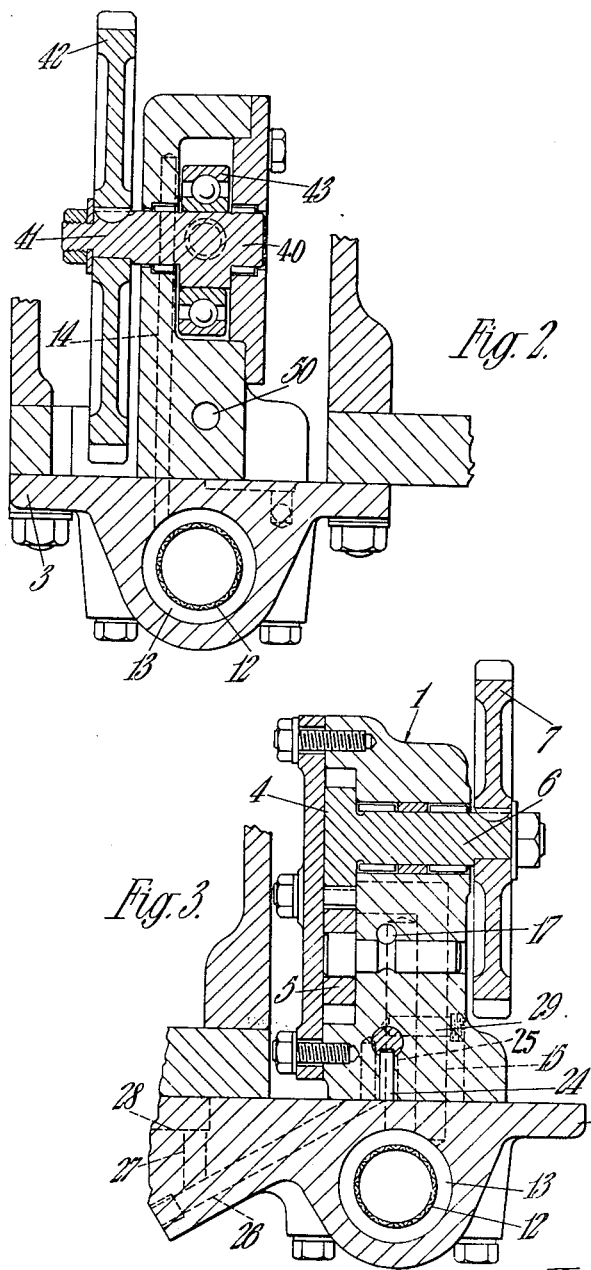

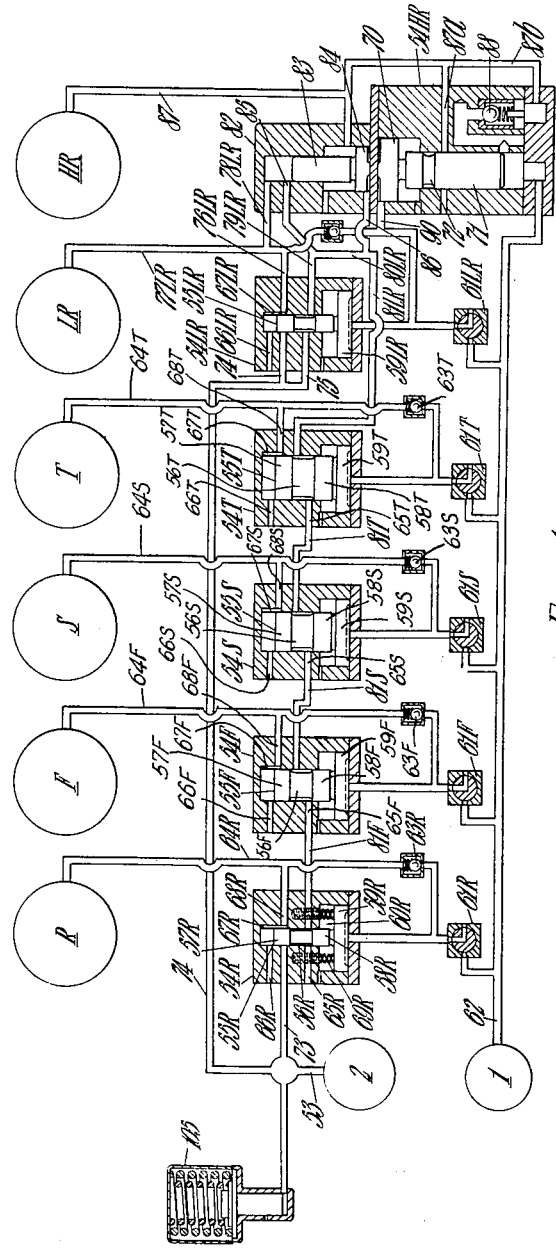

Inventor
A. A. Miller
By Glascock Downing Reebok
Attys.

United States Patent Office 3,058,374
Patented Oct. 16, 1962

3,058,374
FLUID PRESSURE CONTROL OR SERVO SYSTEMS
Albert A. Miller, Coventry, England, assignor to Self-Changing Gears Limited, Coventry, Warwick, England
Filed May 19, 1958, Ser. No. 736,097
Claims priority, application Great Britain May 21, 1957
8 Claims. (Cl. 74—754)

This invention relates to fluid pressure control or servo systems having more than one piston and cylinder or equivalent actuating devices operable by pressure fluid, and is particularly concerned with means for the supply of pressure fluid to control systems for epicyclic change speed gear boxes in which brakes controlling individual epicyclic gear trains are actuated by piston and cylinder or equivalent motor devices.

It is an object of the invention to provide an improved servo control system for epicyclic gearing including brake controlled epicyclic gears of different ratios which enables different actuating fluid pressures to be applied to the brake actuating motor devices in accordance with the differing load requirements which the brakes have to meet. A further object is to provide improved means for supplying pressure fluid to a servo system of the above kind which is rapid and effective in operation and which also affords a more compact construction than conventional arrangements. A further object is to provide improved means for controlling the supply of pressure fluid to such systems which ensures that the delivery pressure is gradually built up to a maximum, but when a fall in delivery pressure occurs the pressure is rapidly returned to a minimum. Such an arrangement is particularly advantageous in the control of actuating or motor devices for the brakes of epicyclic gears, since considerable displacement of actuating fluid occurs during gear changes and the above mode of control affords a delay between the disengagement of one gear and the engagement of another gear, which delay is readily adjustable. A further object of the invention is to provide a servo system for the above stated purpose including a pressure transformer in conjunction with a differential piston type of controlling valve arranged so that an operating fluid pressure applied to one brake actuating device is a desired function of the operating fluid pressure applied to a simultaneously operated actuating device.

Other objects and advantages of the invention will be apparent to those skilled in the art from the later described example.

An embodiment of the invention is illustrated in the accompanying drawings in which:

FIGURE 1 is a sectional elevation of the pump assembly;

FIGURE 2 is a cross section on the line B—B of FIGURE 1;

FIGURE 3 is a cross section on the line A—A of FIGURE 1;

FIGURE 4 is a diagram of the hydraulic circuit;

Figure 8:
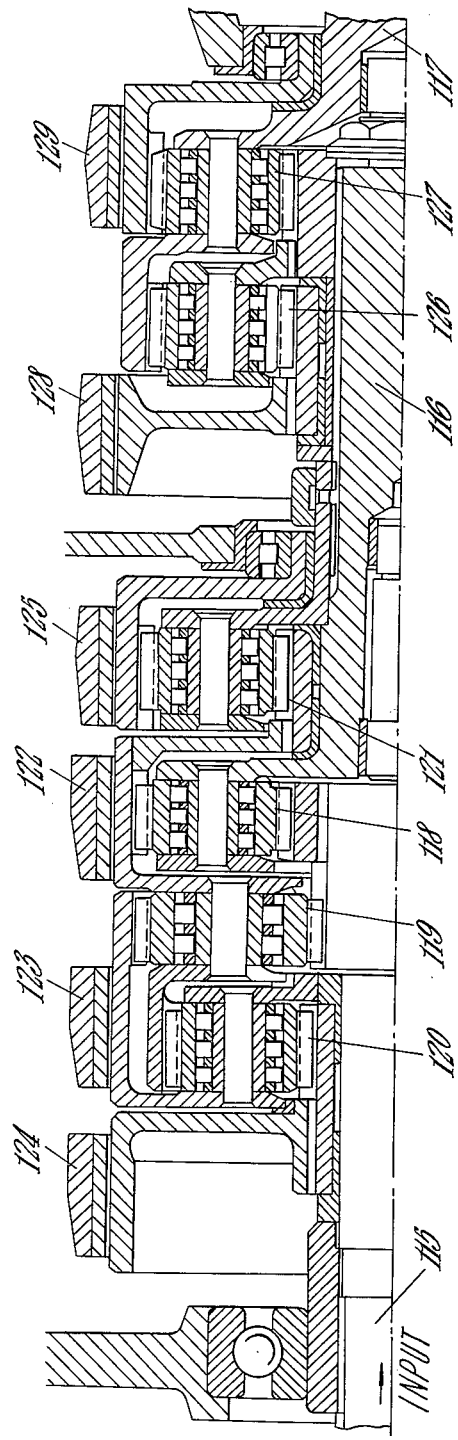
FIGURE 8 is a longitudinal sectional elevation of the upper half of an epicyclic change speed transmission gearing.

In carrying the invention into effect according to one convenient mode applied by way of example to a control system for an epicyclic change-speed gear box, there is provided a pump assembly as shown in FIGURES 1, 2 and 3 for the supply of hydraulic (oil) medium comprising a low pressure pump 1 and a high pressure pump 2 mounted on a common base 3 and arranged to be driven from the input shaft 115 of the conventional gearing shown in FIGURE 8. The low pressure pump 1 is of the gear type having a pair of meshing gear wheels 4, 5 in an enclosing casing. The upper pump gear 4 has a projecting shaft 6 carrying a driving gear wheel 7 (FIGURE 3). A duct 8 from the suction port 9 of the pump communicates with an oil sump (not shown). A delivery duct 10 from the pump delivery port 11 leads to the interior of a filter 12, preferably of cylindrical form as shown, located in a sealed chamber 13 formed in the base 3 and also to the low pressure line 62, shown in FIGURE 4. Passages 14 from the filter chamber 13 lead to the inlet of the high pressure pump to be later described. A further passage 15, referred to as the control passage, leads from the filter chamber to a regulating valve chamber 16 and through a passage 17 to a by-pass valve chamber 18. The regulating valve comprises a piston 19 slidable in a bore and having a reduced end 20 affording an annular space when the piston abuts the right hand end of its bore as seen in FIGURE 1, said space being in communication with the passage 15. The valve piston has an intermediate neck 21 and at its opposite end it is formed with a shoulder 22 which receives a helical loading spring 23. A fixed pin 24 engages a slot in the piston to prevent rotation thereof.

A lubrication port 25 (FIGURE 3) in the valve bore is arranged to be uncovered upon initial movement of the valve 19 against its spring and thereby to be placed in communication with the passage 15 and to supply oil through passages 26, 27, 28 for lubrication purposes. An exhaust port 29 and a port 30 communicating with the suction duct 9 of the pump are arranged so that further movement of the valve 19 connects said ports by way of the valve neck 21 so that recirculation of the pumped oil is afforded when the delivery pressure reaches a desired maximum. The loading spring 23 of the regulating valve reacts upon a control piston 31 slidable in a bore coaxial with the valve bore and biassed by a spring 32 in a direction away from the valve. A reduced rear end 33 of the piston 31 can be held by said spring against a closed end 34 of the bore. A space 35 surrounding said reduced piston end 33 communicates with the previously mentioned control passage 15 by way of a by-pass valve comprising a non-return ball valve 36. A restricted by-pass passage 37 for the ball valve 36 is always open. The arrangement is such that pressure oil from the pump can act on the rear end of the control piston 31 to displace the same against its loading spring 32 and thereby increase the loading of the regulating valve spring 23 until the piston reaches the end of its travel, at which time the oil pressure produced by the pump will be a maximum. In the event of a sudden increased demand on the low pressure oil supply, the pressure in the filter chamber 13 and the control passage 15 falls, and due to the limited flow capacity of the restricted by-pass 37 the pressure behind the control piston 31 lifts the ball 36 so that the control piston moves rapidly to its limit position away from the regulating valve 19, and the loading of the valve spring 23 then corresponds to a lower pressure. A period of time must elapse whilst the fluid pressure on the control piston is built up through the restricted by-pass. An increased demand for oil would be occasioned, for example, by bringing into operation another brake actuating device the cylinder of which must be filled. The arrangement described therefore provides a desired delay period in such circumstances before the pump attains its full operating pressure.

The high pressure pump 2 of the assembly comprises a pair of spring loaded reciprocating pump plungers 38 and 39 driven by an eccentric 40, see FIGURES 1 and 2. The pump shaft 41 has secured to it a gear wheel 42 whereby it is geared to the gear wheel 7 of the low pressure pump 1. The eccentric 40 has mounted thereon a ball bearing assembly 43 the outer race of which engages the inner ends of the plungers 38, 39, the latter being aligned in suitable bores in the pump casing 44 which is mounted on the base 3 above the filter chamber. Inward movement of each plunger draws oil through a duct 14 from the filter chamber through a spring loaded inlet ball valve 45 or 46. On the outward stroke of each plunger the inlet valve closes and oil is discharged through a spring loaded outlet ball valve 47 or 48 through passages 49, 50, 51 and 52 to a high pressure supply duct 53 for the brake operating system. As an example, the delivery rate of the high pressure pump 2 may be about one eighth of that of the low pressure pump 1 and consequently the former pump may be of very compact construction.

It will be seen that the pump assembly provides a low pressure oil supply, a high pressure oil supply and also, with an appropriate position of the control valve, a lubrication supply.

The control system for the epicyclic change speed gear box is shown diagrammatically in FIGURE 4 and includes six piston and cylinder devices for actuating and controlling brakes of the different main and auxiliary epicyclic gear trains. As an example, a system for a gear box affording six forward and two reverse speeds in conjunction with a dual range arrangement, provided by auxiliary epicyclic gears will be described. The break cylinders R, F, S, T, LR and HR will be referred to as reverse, first, second, third, low range and high range cylinders respectively. The first five of said cylinders are each provided with a pressure relay valve shown at 54R, 54F, 54S, 54T, 54LR, and the high range auxiliary gear cylinder HR is provided with a pressure sensitive piston valve 54HR. The relay valves are of similar construction, and referring to valve 54R this comprises a slidable valve piston having a small end 55R, a groove 56R separting two cylindrical control surfaces 57R and 58R, and a large end piston 59R, operating in a separate cylinder space 60R.

Electromagnetically operated valve 61R, shown for convenience as a rotary valve in FIGURE 4 only, controls the admission of oil from a low pressure pump delivery duct 62 to the large end piston 59R to raise the valve, and at the same time such oil is also admitted through a non-return ball valve 53R and a duct 64R to the brake cylinder R. The first four relay valves have small pistons 55R, 55F, 55S, and 55T which are of progressively increasing diameter. The groove 56R in the small piston of relay valve 54R is arranged in association with exhaust ports 65R, 66R, a lateral groove 67R in the valve bore or cylinder, and a port 68R in communication with the brake cylinder duct 64R such that when the valve occupies its lowermost or non-operated position as seen in FIGURE 4 the brake cylinder R is connected to exhaust. All the relay valves are biassed by springs into non-operated position and one of these springs is shown at 69R.

The relay valve 54F has a slidable valve piston having a small end 55F, a groove 56F separating two cylindrical control surfaces 57F and 58F, and a large end piston 59F. Exhaust ports 65F and 66F are provided, and a lateral groove 67F in the bore of the small valve piston is in communication with a port and duct 68F which is in communication with a duct 64F leading to brake cylinder F. In operation, upon admission of low pressure oil by operation of valve 61F, the piston valve is moved upwardly to cut off the exhaust 66F. This valve movement also admits the high pressure supply from duct 74 by way of the ducts 81LR, 81T and 81S through the groove 67F and also to the brake cylinder F by way of the port and duct 68F and the duct 64F. Thus admission of high pressure fluid to the brake cylinder is controlled by the small end 55F of the relay piston, and the non-return valve 63F closes upon such admission.

Similarly the relay valve 54T has a slidable valve piston with a small end 55T, a groove 56T separating two cylindrical control surfaces 57T and 58T, and a large end piston 59T. Exhaust ports 65T and 66T are provided, and a lateral groove 67T in the bore of the small valve piston is in communication with a port and duct 68T which is in communication with a duct 64T leading to brake cylinder T. In operation, upon admission of low pressure oil by operation of the valve 61T, the piston valve movement also admits the high pressure supply from duct 74 by way of duct 81LR through the groove 67T and also to the brake cylinder T by way of the port and duct 68T and the duct 64T. Thus admission of high pressure fluid to the brake cylinder T is controlled by the small end 55T of the relay piston, and the non-return valve 63T closes upon such admission.

The pressure sensitive piston valve 54HR comprises a large piston 70 integral with a small piston 71, the latter having an intermediate control groove 72. The hydraulic system includes the low pressure oil supply duct 62 which can be placed in communication with the large pistons of all the relay valves, and is also in direct communication with the small piston 71. The high pressure duct 53 from the pump 2 has three branches, 73, 74 and 75, and of these, two branches 74 and 75 lead to ports controlled by the small piston 55LR of the low range relay valve 54LR. When the valve 54LR is raised by opening its electromagnetic valve 61LR the high pressure supply is admitted through ducts 76LR and 77LR to the low range auxiliary gear brake cylinder LR and also through a duct 78LR to a pressure transformer to be described later. When valve 61LR is not operated, the high pressure supply is admitted by an alternative path by way of ducts 79LR and 80LR to a relay duct, a part of which is shown at 81LR. The third high pressure branch 73 is connected to a port controlled by the small piston 55R of the reverse relay valve 54R so that raising of the latter admits high pressure oil directly to the reverse brake cylinder R by way of ducts 68R and 64R. The relay duct mentioned above comprises a series of passages interconnecting the small piston bores of the first four valves in the region of their valve control grooves so that in non-operated position of these valves there is afforded a through connection to the exhaust port 65R on the relay valve 54R. These interconnecting ducts are shown at 81T, 81S, and 81F, and operate in conjunction with the duct 81LR referred to above.

A pressure transformer 82 is associated with the pressure sensitive valve 54HR and comprises a casing having bores for a differential piston 83, 84. The small bore piston 83 has a connection 78LR with the brake cylinder LR and a second connection 85, when the piston is down, with the relay duct by way of the duct 80LR. A branch 86 from the relay duct is connected to the space below the large piston 84. When the relay valve 54LR is operated, high pressure oil is admitted to the brake cylinder LR and to the small piston end of the transformer 82. When the relay valve 54LR is inoperative the low range cylinder duct 77LR is connected by way of the duct 76LR, the groove 67LR and the duct 66LR to exhaust.

A duct 87, 87a, connects the brake cylinder HR to the small bore of the piston valve 71 and also to the space below the small piston by a duct 87b through a non-return valve 88. It will be noted that this space is already in communication with the low pressure duct 62. When the piston 70, 71 is raised, low pressure oil is admitted to the brake cylinder HR. When the electromagnetic valve 61LR is opened, low pressure oil is admitted above the large piston 70 so that the valve is forced down and the groove 72 connects the duct 87a from the brake cylinder HR to an exhaust port 89.

Considering now the operation of the system when it is desired to engage the low range first, second, or third gear, the electromagnetic valve 61LR is opened to admit low pressure oil to the large piston 59LR of the relay valve 54LR to raise the latter, thereby admitting high pressure oil to the brake cylinder LR by way of the ducts 76LR and 77LR and also to the small piston 83 by the duct 78LR, to force said piston downwardly.

The pistons 83, 84 will previously have been biased to its uppermost position by oil passing through the duct 75. In this position, as will be seen from FIGURE 6, there will always be a space above the piston 83. The downward movement uncovers the duct 85 so that the high pressure oil entering above the small piston 83 flows through the duct 85 to the space beneath the large piston 84 and to the relay duct which is sealed off by operation of one of the relay valves. Pressure builds up in the said relay duct and the piston 84 moves upwardly tending to cut off the supply from duct 85 as later described. It will be appreciated that at the point of cut off there are in effect two closed circuits having different relieving pressures, one being the pressure at which valve 55LR relieves, this being the maximum for the circuit, and the other being the pressure at which one of the relay valves 54F, 54S, or 54T relieves. For these forward gear controlling relay valves, the latter pressure multiplied by the transformer ratio is always less than the aforesaid maximum pressure, and consequently the pressures above and below the transformer piston at which equilibrium is obtained will be regulated by the particular relay valve 54F, 54S, or 54T which is operated at that time. Low pressure oil is also admitted to the upper piston 70 of the valve 54HR by a duct 90 to force the piston downwardly and thereby exhaust the brake cylinder HR through the groove 72. As previously described the transformer piston 83 admits high pressure oil to the relay duct 81LR through the duct 85 and thence by the branch duct 86 to the transformer piston 84 which accordingly receives an upward thrust the effect of which is to tend to throttle high pressure oil escaping from above the piston 83 through the duct 85. The pressure affording this upward thrust is determined by which of the relay valves has been operated, since the individual relay valves control respective exhaust ports which determine the pressures in the interconnecting relay ducts 81F, 81S and 81T as later described. The transformer piston reaches a position of equilibrium when the pressure in the relay duct 81LR has been reduced in relation to the pressure in the high pressure low range duct 77LR in proportion as the transformer piston areas are related, e.g. 3:1. The pressures at which such equilibrium is established are determined by whether the first, second or third gear relay valves are also operated. Thus for example, if the piston areas of the third gear relay valve 54T are in the ratio of 2:1 and the low pressure supply is at 100 lbs. per square inch, then when said relay valve is opened the pressure in the third gear brake cylinder T and in the relay duct will be 200 lbs. This is because operation of the relay valve 54T tends to cut off exhaust of high pressure fluid from above the small piston 55T, and the valve will assume an intermediate position of equilibrium in which the forces on the small and large pistons of the valve are in balance. This occurs when the pressure on the small piston is equal to the low pressure, i.e. 100 lbs. per square inch, multiplied by the area of the large piston and divided by the area of the small piston, i.e. 200 lbs. per square inch. Assuming that the areas of the transformer pistons 84 and 83 are in the ratio of 3 to 1, pressure in the brake cylinder LR and its duct will be three times as much. This is because in its position of equilibrium as previously described the relay valve piston 55T maintains a pressure at its small end which is twice that of the low pressure supply. This pressure will be present in the relay duct 81LR and below the large transformer piston end 84, so that by reason of the transformer action the pressure above the small piston 83 and in the duct 77LR supplying the cylinder LR will be three times as much, as stated above, this pressure being derived from the high pressure supply duct 74. Thus the gear engaging brake cylinder T receives sufficient pressure to ensure positive but smooth gear engagement, and the brake cylinder LR is supplied with an appropriate pressure to deal with the increased torque reaction due to the lower gear ratio. Similar considerations apply to engagement of first and second gears.

Considering now the engagement of first, second or third gears in the high range, it is to be noted that the brake cylinder HR and the corresponding pressure sensitive piston valve 54HR are always connected to the low pressure oil supply unless the electromagnetic valve 61LR is energized to operate its relay valve 54LR. The electrical control circuits are arranged so that when operation of the brake cylinder HR is required the electromagnetic valve 61LR is not energized. The piston valve 54HR is held in its upper position by low pressure oil acting on the end of the small piston 71. The relay valve 54LR (not operated) cuts off the high pressure duct 74 from the duct 77LR and connects said high pressure duct to the relay duct through the ducts 79LR and 80LR. Also the valve 54LR connects the brake cylinder LR to exhaust through the duct 76LR and the groove 67LR, thereby exhausting pressure oil from above the transformer piston 83, which thereupon rises under pressure from the relay duct 81LR upon the piston 84. The brake cylinder HR and its duct 87 are thus connected to the relay duct 81LR and the brake is operated by pressure established in said relay duct by operation of any of the relay valves 54F, 54S or 54T. It follows that in these circumstances the brake operating pressure in the cylinder HR is the same as that of the brake cylinder of the selected gear.

For obtaining engagement of high reverse gear the electromagnetic valve 61R alone is energized to raise the reverse relay valve 54R. The brake cylinder HR will already be in communication with the high pressure supply through the relay duct, but raising of the reverse relay piston closes the exhaust 65R at the end of the series of first, second and third relay and thus seals the said relay duct so that the high pressure is communicated to the auxiliary gear cylinder HR. Raising of the reverse relay valve also admits high pressure oil to the reverse brake cylinder R and to the small piston end 55R of said valve. The construction of the relay valve is such that when occupying its uppermost position, some oil is present above the piston 57R. Thus pressure in the brake cylinder R builds up to a maximum until a spill over to the exhaust 66R takes place through downward movement of the valve.

To obtain engagement of a low reverse gear the electromagnetic valves 61R and 61LR are energized so that low pressure oil is admitted by the latter valve to the large piston 70 of the valve 54HR to cut off the low pressure supply to the auxiliary gear brake cylinder HR and to connect the latter to exhaust at 72. Operation of the relay valve 54LR also disconnects the relay duct 81LR from the high pressure duct 74 and connects the latter to the auxiliary gear brake cylinder LR. The result is that maximum oil pressure is supplied to the reverse and low range brake cylinders R and LR.

The principle of operation of the relay valves 54R, 54F, 54S, 54T, and 54LR is the same for each and this will now be described with reference to the valve 54R. The large piston 59R can be supplied with low pressure oil to move the valve against spring pressure to an "on" position which cuts off the exhaust 66R from the end 55R of the small piston. This valve movement also connects the high pressure oil supply from the duct 73 through the groove 67R to the end of said piston and also to the brake cylinder R by way of ducts 68R and 64R. Pressure builds up until the forces on the small and large pistons balance, this pressure being equal to the low pressure multiplied by the area of the large piston and divided by the area of the small piston. It is to be noted that when low range first, second, or third gear is selected the pressure in the brake cylinder LR is not determined by the relay valve 54LR but equals the pressure in the selected brake cylinder multiplied by the transformer ratio. It will be understood that when all relay valves are inoperative the high pressure pump 2 maintains a circuit through the duct 74 to the relay valve 54LR and thence through the relay duct 81LR and its continuations 81T, 81S and 81F and each relay valve in turn to the exhaust at 65R. Said ducts are thereby filled with liquid in preparation for relay valve operation. When the relay valve is operated it cuts off the exhaust from the said circuit and the latter is thereby closed, when the non-return valve (e.g. 63R) of the corresponding brake cylinder closes, to the extent that liquid can only escape therefrom when maximum pressure in the brake cylinder is reached and the respective relay valve is displaced as previously described to permit limited exhaust therefrom.

Figure 5:
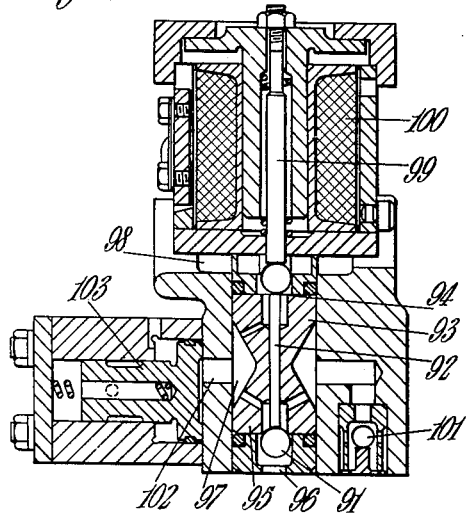
FIGURE 5 is a sectional elevation of an electro-magnetically operated valve.

A suitable constructional form for the electromagnetic and relay valves is shown in FIGURE 5. A pair of spherical valve members 91 are spaced by a stem 92 slidable in a body 93 having valve seats 94 and 95. Oil pressure entering at 96 holds the valve members in the position shown in which the space 97 is connected to exhaust at 98. Downward movement of an armature 99 when a coil 100 is energized closes the exhaust and admits pressure oil to the space 97 and thence to the appropriate brake cylinder through the non-return valve 101 and through a passage 102 to the relay valve 103.

Figure 6:
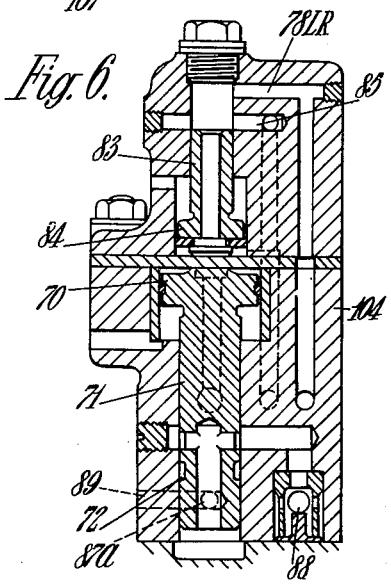
FIGURE 6 is a sectional elevation of a pressure transformer and pressure-sensitive valve.

A suitable constructional form of the pressure transformer and pressure sensitive valve assembly is shown in FIGURE 6. The valve body 104 houses the differential pistons 83, 84. The space above the end of the small piston 83 communicates with ducts 78LR and 85 (see also FIGURE 4) which are contained in the body. The pressure sensitive valve comprises the combined pistons 70 and 71, the latter having a groove which connects, duct 62 (FIGURE 4) with the duct leading to the non-return valve 88, when the piston is in its higher position. A second groove 72 formed in the piston connects duct 87a to an exhaust 89 when the piston is in its lower position.

Figure 7:
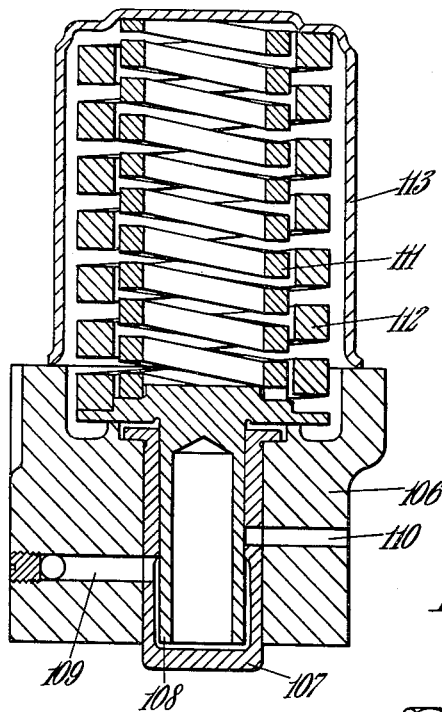
FIGURE 7 is a sectional elevation of a pressure accumulator.

An accumulator is connected to the high pressure duct 74 as indicated at 105 in FIGURE 4, and a constructional form thereof is shown in FIGURE 7. The accumulator comprises a body 106 having a cylinder with an enlarged lower end in which is slidable a piston 108. High pressure oil is admitted to the cylinder by a duct 109 and can exhaust at 110. The piston is loaded by two concentric springs 111 and 112 contained in a casing 113 secured to the body.

The operating mechanism for the epicyclic gears may be of any desired kind including fluid operated band brakes and/or clutches.

A change speed transmission gearing suitable for use with the above described arrangements is shown in FIGURE 8 and comprises an input shaft 115, an intermediate shaft 116, and an output shaft 117. Main epicyclic gears indicated at 118, 119, 120 and 121 provide first, second, and third speeds and a reverse, these being obtained by applying the respective brakes 122, 123, 124 and 125. Auxiliary epicyclic gears indicated at 126 and 127 provide respectively a high range gear and a low range gear in serial connection with a previously selected main gear, these being obtained by engaging either the brake 128 or the brake 129.

I claim:

1. Change speed epicyclic transmission gearing comprising a plurality of main epicyclic gears of differing ratios and including brake means for engaging a selected main gear, auxiliary epicyclic gears of differing ratios, means affording a serial drive connection between a selected main epicyclic gear and a selected auxiliary epicyclic gear, said auxiliary gears being dimensioned to provide respectively a low gear range and a high gear range in conjunction with a selected main gear, brake means for effecting engagement of selected main and auxiliary gears, fluid operated motor devices each arranged to engage the brake means of the selected gears, a source of low pressure operating fluid and valve means for controlling admission of said fluid to one or other of said motor devices, a source of high pressure operating fluid and a plurality of relay valve means each operable to admit high pressure fluid to a selected motor device of one of the main gears, means for communicating fluid from said low pressure source to each of said motor devices and relay valve means, said communicating means including the aforesaid valve means for controlling admission of said fluid to one or other of said motor devices whereby opening of said valve means admits low pressure fluid simultaneously to a relay valve means and a motor device, each of said relay valve means comprising a double ended piston valve operable by low pressure fluid and having a piston area disposed to control passage means admitting fluid from the high pressure source to one of the said motor devices, said piston valve areas being dimensioned in accordance with the magnitude of the gear ratios of the respective main gears whereby the fluid pressures applied to said motor devices are in corresponding proportion, valve means for controlling admission of high pressure fluid to the motor devices of the auxiliary gears, and regulating means operable in response to the maximum operating pressure applied to a main gear motor device, means affording communication between the source of high pressure operating fluid and said regulating means, means affording communication between said regulating means and each of said relay valve means, said regulating means including a fluid pressure multiplying device and means for bringing said multiplying device into operation when the motor device of the auxiliary gear providing the low gear range is actuated whereby multiplied fluid pressure is supplied to that one of said motor devices which is associated with a previously selected main gear.

2. Gearing according to claim 1 in which said multiplying device comprises a pressure transformer with a cylinder and a differential piston having a large end and a small end, means for supplying high pressure operating fluid to both said piston ends, and an escape outlet from the small piston end of the cylinder arranged to be controlled by movement of said piston end whereby the piston assumes a position of equilibrium and affords an operating pressure which is a desired multiple of the operating pressure in the simultaneously selected main gear motor device.

3. Gearing according to claim 1 in which the communicating means between the low pressure source and each relay valve means and motor device includes a branch passage leading to the motor device and a non-return valve in said branch passage.

4. Gearing according to claim 1 in which the sources of low and high pressure supply comprise two pumps, a common delivery duct for said pumps, and non-return valve means between the low pressure pump delivery and said common duct, the low pressure pump being dimensioned for a high rate of delivery relative to the delivery of the high pressure pump.

5. Gearing according to claim 1 in which the sources of pressure fluid comprise a low pressure pump and a high pressure pump, a regulating valve in the low pressure pump delivery, means for loading said valve, and means responsive to the pump delivery pressure for varying said loading.

6. Gearing according to claim 1 in which the sources of fluid pressure comprise a low pressure pump and a high pressure pump, a regulating valve in the low pressure pump delivery, a first spring loading said regulating valve, a bearing member for said first spring constituted by a displaceable piston, means for communicating the pump delivery pressure to said piston, and a second spring loading said piston to oppose displacement thereof.

7. Gearing according to claim 6, comprising a passage affording communication between the said pump delivery and said piston, a non-return valve in said passage and a restricted passage by-passing said non-return valve.

8. Gearing according to claim 1, in which the sources of fluid pressure comprise a low pressure pump and a high pressure pump, a regulating valve in the low pressure pump delivery, means for variably loading said regulating valve in accordance with the low pressure pump delivery pressure, and a lubrication supply port controlled by said regulating valve to supply lubricant upon initial opening of said valve.

References Cited in the file of this patent

UNITED STATES PATENTS

| | | |
|---|---|---|
| 2,239,657 | Stadlin | Apr. 22, 1941 |
| 2,689,489 | Storer et al. | Sept. 21, 1954 |
| 2,713,800 | Forster | July 26, 1955 |
| 2,912,884 | Christenson et al. | Nov. 17, 1959 |